W. R. COLLIER.
LOCK NUT.
APPLICATION FILED MAY 4, 1915.
1,185,772.  Patented June 6, 1916.
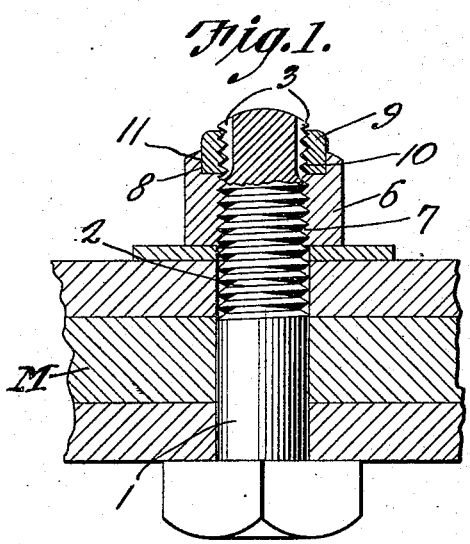
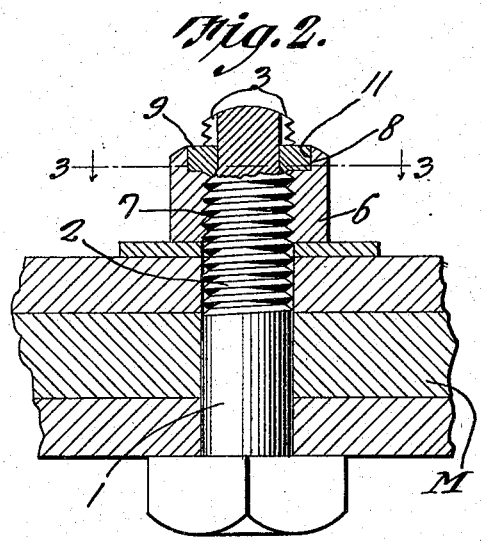
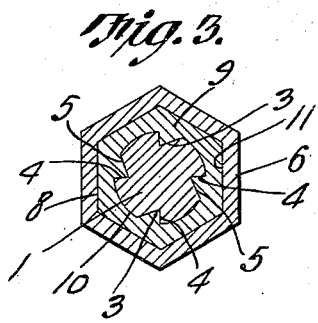
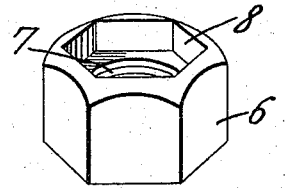
Witnesses
W. R. Collier  Inventor
by C. A. Snow & Co.
Attorneys

UNITED STATES PATENT OFFICE.

WILLIAM REID COLLIER, OF AUSTIN, TEXAS.

LOCK-NUT.

1,185,772.　　　Specification of Letters Patent.　　Patented June 6, 1916.

Application filed May 4, 1915.　Serial No. 25,768.

*To all whom it may concern:*

Be it known that I, WILLIAM REID COLLIER, a citizen of the United States, residing at Austin, in the county of Travis and State of Texas, have invented a new and useful Lock-Nut, of which the following is a specification.

This invention relates to locking bolts and nuts and more particularly to that type in which a relatively soft metal is employed as the locking medium.

An object of the invention is to provide a novel locking means in which the component members coöperate to insure a positive locking action which will not impair the strength of the device.

A further object of the invention is to provide a locking bolt and nut of generally improved construction whereby the device will be simple, durable and inexpensive in construction, as well as convenient, practical, serviceable and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein:—

Figure 1 is a longitudinal sectional view of the invention with the component members in their unlocked condition; Fig. 2 is a similar view but depicting the component members in their locked condition; Fig. 3 is a transverse sectional view of the invention taken on the line 3—3 of Fig. 2; and Fig. 4 is a perspective view of the locking nut before the soft locking metal has been applied thereto.

In carrying out the invention there is provided a bolt 1 which has one end thereof threaded, as indicated at 2. A plurality of longitudinal slots 3, of predetermined lengths, are formed in the threaded end of the bolt 1, which slots are approximately V-shaped in cross section and have a radial wall 4 and a wall 5 which is almost perpendicular to the wall 4.

In order to provide a positive and practical locking means, there is provided a nut 6 having an axial threaded bore 7 which communicates with a non-circular axial recess 8, that is formed in the outer end of the nut 6, for the reception of a soft locking element or bushing 9. This locking element 9 may be formed of any suitable soft malleable metal such as lead, Babbitt metal and the like. The member 9 has an axial threaded bore 10 which corresponds to and communicates with the threaded bore 7, while the periphery of the locking member 9 is non-circular, as indicated at 11, to conform and adhere to the non-circular recess 8, which extends into the nut for approximately one-third of its axial dimension.

To insure the maximum strength for this device, it is employed most advantageously in connection with structures of known dimensions, which permits an accurate predetermination of the length of the slots 3, so that the length of the slots 3 approximate the axial dimensions of the soft locking member 9. Therefore, by this arrangement the greater part of the axial bore 7 of the nut 6 is in uninterrupted threaded engagement with the threaded end 2 of the bolt 1.

In the practical employment of this device the bolt 1 is placed within suitable apertures that are formed in the material M which is to be secured by this device, after which the nut 6, with its soft locking member 9, is screwed upon the threaded end of the bolt 1 until the desired tension is exerted upon the material M. It will be observed that the inner end of the slot 3 terminates approximately in the same transverse plane as the inner axial terminal of the locking member 9, so that the portion of the threaded bore 7 of the nut 6 that lies between the inner axial terminal of locking member 9 and the inner face of the nut 6, is in uninterrupted threaded engagement with the bolt 1, while the soft locking member 9 threadily engages the outer end of the bolt 1. The peripheral continuity of this threaded engagement, however, is interrupted at predetermined intervals by the longitudinal radial slots 3.

To lock the nut 6 upon the bolt 1, the outer or projecting portion of the member 9 is hammered or forced into the slots 3, by any suitable means, until the outer face of the member 9 is even or flush with the outer face of the nut 6. Now the nut 6 is securely locked upon the bolt 1, as indicated in Figs. 2 and 3, so that any movement of these members with respect to each other is prevented under ordinary conditions, but should there be slight retrograde movement of the nut 6 upon the bolt 1, such action would force an additional quantity of the soft metal 9 into the slots 3, owing to the peculiar shape of said slots, so that continued retrograde movement of the nut 6 upon the bolt 1 would occasion commensurately increased resistance.

Having thus described my invention, what is claimed as new is:—

1. In a device of the character described, including a bolt having longitudinal slots extending inwardly from the threaded end thereof; a nut having an axial non-circular recess formed therein and an axial threaded aperture which communicates with the said axial non-circular recess; a soft malleable locking member permanently secured within the non-circular recess, and having an axial threaded aperture which communicates with the axial threaded aperture of the nut, said locking member adapted to be hammered into engagement with the longitudinal slots of the bolt, to lock the nut to the said bolt.

2. In a device of the character described, including a bolt having longitudinal slots of predetermined length extending inwardly from the threaded end thereof; a nut having an axial non-circular recess formed therein and an axial threaded aperture which communicates with the said non-circular recess; a soft malleable locking member permanently secured within the non-circular recess and having an axial threaded aperture which communicates with the threaded aperture of the nut, the said non-circular recess and malleable locking members are adapted to extend within the nut a distance sufficient to cause their inner axial terminals to lie in the same transverse plane as the inner terminal of the longitudinal slots when the nut has been screwed to securing position; an outstanding portion extending from the malleable locking member, beyond the outer face of the nut, said outstanding portion is adapted to be forced into engagement with the said longitudinal slot of the bolt, to lock the nut to the bolt.

In testimony that I claim the foregoing as my own, I have hereto affixed my signature in the presence of two witnesses.

WILLIAM REID COLLIER.

Witnesses:
W. N. LE SUEUR,
M. E. ROGERS, Jr.

Copies of this patent may be obtained for five cents each, by addressing the "Commissioner of Patents, Washington, D. C."